United States Patent Office 2,805,175
Patented Sept. 3, 1957

2,805,175

PROCESS FOR HYDROLYZING CELLULOSE ACETATE FILMS WITH CAUSTIC SODA LYE

Theodor Haefeli, Ennetburgen, Nidwalden, Switzerland, assignor to Cinetechnik A. G., Zurich, Switzerland No Drawing. Application February 3, 1954, Serial No. 408,037

Claims priority, application Germany February 10, 1953

3 Claims. (Cl. 117—118)

This invention relates to an improved process for hydrolyzing cellulose acetate films with caustic soda lye for the purpose of improving the absorbing power of the film for dyes.

It is well known that films of cellulose acetate due to their hydrophobic nature cannot or only with difficulty can be dyed by normal dyeing methods. Therefore attempts have been made to develop dyes which under certain circumstances, e. g. at higher temperatures are capable of dyeing cellulose acetate or to improve the dyeing power by addition of alkalies to the dye bath. It has moreover been proposed to improve the absorbing power for dyes of cellulose acetate films by preliminary liberation of the amines or phenols from their salts. Another method of improving the absorbing power of the film for dyes consisted in swelling the cellulosic material with solutions of inorganic acids. It has also been proposed to add small amounts of rhodanides to the dye bath or to pretreat the film with an alkali containing salt solution.

But only the methods of improving the absorption power for dyes of cellulose acetate films by surface-hydrolysis in a caustic soda lye bath acquired a wider spread propagation. By provision of a surface layer of hydrated cellulose there was obtained a certain affinity for basic dyes and direct dyes. The regeneration of hydroxycellulose from the cellulose ester in an alcohol containing soda lye bath as proposed in a previous process has been shown to be unsuitable, because alcohol in any form hardly influences the process of hydrolysis, but causes an extreme extensibility of the film. Another proposition to add ethanol to the caustic soda lye had also to be regarded as unsuitable because of the opaque surface it produces on the film, which is to be regarded as a serious drawback.

Proposals to add soap-products which act only as wetting agents to the caustic soda lye could also not satisfy. Finally the method of treating cellulose acetate film in a bath containing boric acid and sodium carbonate acquired some interest. The practical application of this method, however, is hindered by the fact that the film must be treated 2 to 5 hours at temperatures up to 80° C. whereby the structure of the cellulose acetate is destroyed.

All previous methods cited above have considerable drawbacks. Primarily the hydrolyzing lye does not penetrate uniformly into the surface layer of the film. This results in a irregular deacetylation. Moreover the regenerated cellulose after hydrolysis contains spots with residual ester groups, which depending on the acetyl content of the cellulose acetate and the softener used may be so considerable that the subsequent dyeing results in a more or less irregular colouration. An especially heavy drawback of the known methods is that the surface hydrolyzed film has to be dyed in a semi-moist state, i. e. immediately after hydrolysis.

According to the present invention the absorbing power of cellulose acetate films for dyes is improved also by hydrolysis with caustic soda lye but said soda lye contains an equalizing agent securing a uniform surface hydrolysis, which is neither affected by the amount of acetyl groups in the film nor by the character of the softener used therein. According to the process of the present invention hydrolysis of cellulose acetate films is effected with caustic soda lye containing a condensation product of ethylene oxide with alkylphenols. Such condensation products correspond either to the formula

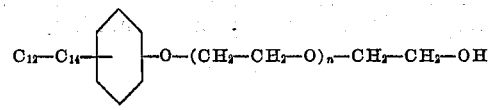

or to the formula

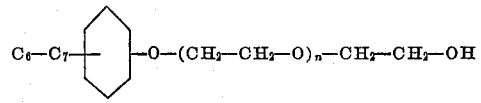

wherein $n$ is an integer from 12 to 20 inclusive, as for example the product obtained by condensation of dodecylphenol with 12 molequivalents of ethylene oxide. The addition of these equalizing agents to the caustic soda lye does not only result in a uniform hydrolysis of the film surface but at the same time also in a uniform penetration of the hydrolyzing agent.

Depending on the nature and the softener content of the cellulose acetate film to be treated a hydrolyzing bath containing about 10–16 milliliters of the above defined alkylphenols per liter of an about 2–5% aqueous caustic soda lye is used, the lower limits of concentration being used for cellulose diacetate films whereas the upper limits are preferred for hydrolysis of cellulose triacetate films. Depending on the degree of acetylation of the film and on the bath concentration the working temperature is within the range of about 63–75° C. and the time of interaction in the range of about 10–15 minutes per meter of film. The optimal working conditions for a given film may easily be determined by some preliminary tests. The film travels continuously at the required speed through the hydrolyzing bath and is then finished in a manner known per se.

A further advantage of the present invention resides therein that the depth of the hydrolyzed layer may be established, controlled and measured by mere action of the hydrolyzing lye so that the buffers and dyeing methods which have been used hitherto for this purpose become superfluous.

In contradistinction to the known methods which require a treating time of 2 to 5 hours the hydrolysis according to the present process is completed in not more than 15 minutes. Due to this short treatment it is possible to hydrolyze uniformly surface areas of any desired length and width.

In contradistinction to the methods used hitherto the new process of the present invention does not affect the elasticity and bending strength of the hydrolyzed film neither during hydrolysis, drying or storage. A further advantage of the process according to the invention is that it has been established that hydrolysis does not impair or affect the original gloss and glass-clear transparency of the film whereas the known methods for surface hydrolysis of cellulose acetate films in most cases result in an opaque dull surface.

What I claim is:

1. In the process for the hydrolysis of cellulose acetate films with caustic soda, the addition to the caustic soda of a condensation product of at least about 1% by volume of ethylene oxide and an alkylphenol.

2. In a process for the hydrolysis of cellulose acetate films with caustic soda, the addition to the caustic soda of a condensation product of at least about 1% by volume of ethylene oxide and an alkylphenol represented by the following formula:

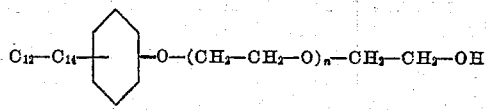

where $n$ is an integer from 12 to 20 inclusive.

3. In a process for the hydrolysis of cellulose acetate films with caustic soda, the addition to the caustic soda of a condensation product of at least about 1% by volume of ethylene oxide and an alkylphenol represented by the following formula:

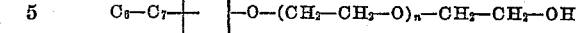

wherein $n$ is an integer from 12 to 20 inclusive.

References Cited in the file of this patent

UNITED STATES PATENTS

| | | |
|---|---|---|
| 2,213,477 | Steindorff | Sept. 3, 1940 |
| 2,280,055 | Andersen | Apr. 21, 1942 |